United States Patent
Demuth et al.

(10) Patent No.: US 12,214,551 B2
(45) Date of Patent: Feb. 4, 2025

(54) LASER PULSE SHAPING FOR ADDITIVE MANUFACTURING

(71) Applicant: Lawrence Livermore National Security, LLC, Livermore, CA (US)

(72) Inventors: James A. Demuth, Woburn, MA (US); Andrew J. Bayramian, Marblehead, MA (US); Eric B. Duoss, Danville, CA (US); Joshua D. Kuntz, Livermore, CA (US); Christopher M. Spadaccini, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 18/460,845

(22) Filed: Sep. 5, 2023

(65) Prior Publication Data

US 2023/0405927 A1    Dec. 21, 2023

Related U.S. Application Data

(62) Division of application No. 17/984,786, filed on Nov. 10, 2022, now Pat. No. 11,801,635, which is a
(Continued)

(51) Int. Cl.
*B29C 64/273* (2017.01)
*B22F 10/10* (2021.01)
(Continued)

(52) U.S. Cl.
CPC .......... *B29C 64/273* (2017.08); *B22F 10/28* (2021.01); *B22F 12/00* (2021.01);
(Continued)

(58) Field of Classification Search
CPC ........ B22F 10/10; B22F 10/28; B22F 10/362; B22F 10/366; B22F 12/00;
(Continued)

(56) References Cited

U.S. PATENT DOCUMENTS

| 4,944,817 A | 7/1990 | Bourell et al. |
| 5,155,324 A | 10/1992 | Deckard et al. |

(Continued)

FOREIGN PATENT DOCUMENTS

| EP | 2292357 A1 | 3/2011 |
| WO | 2015017077 A1 | 2/2015 |

(Continued)

OTHER PUBLICATIONS

Extended Search Report for correspondening European Patent Application No. 17744668.9 dated Sep. 3, 2019, 8 pp.

*Primary Examiner* — Joe E Mills, Jr.
(74) *Attorney, Agent, or Firm* — HARNESS, DICKEY & PIERCE, P.L.C.

(57) ABSTRACT

The present disclosure relates to a method involving a substrate having an interface layer, wherein the interface layer (IL) forms only an upper surface portion of the substrate, and a feedstock material (FM) placed on the IL. The method involves using a laser system to generate first and second beam components providing first and second power flux levels, respectively, where the second level is greater than the first. The FM is heated to a first level short of a melting point using the first beam component, at which point the particles of the FM begin to experience surface tension forces relative to the IL. Further heating the FM to a second level melts the FM and also melts the IL of the substrate, but where a portion of the IL remains unmelted by the second beam component as the particles of the FM and the IL are bonded together.

20 Claims, 6 Drawing Sheets

Related U.S. Application Data division of application No. 16/538,152, filed on Aug. 12, 2019, now Pat. No. 11,524,458, which is a division of application No. 15/010,107, filed on Jan. 29, 2016, now Pat. No. 10,376,987.

(51) Int. Cl.

| | | |
|---|---|---|
| *B22F 10/28* | (2021.01) | |
| *B22F 10/362* | (2021.01) | |
| *B22F 10/366* | (2021.01) | |
| *B22F 12/00* | (2021.01) | |
| *B23K 26/0622* | (2014.01) | |
| *B23K 26/066* | (2014.01) | |
| *B23K 26/342* | (2014.01) | |
| *B29C 64/153* | (2017.01) | |
| *B29C 64/282* | (2017.01) | |
| *B29C 64/286* | (2017.01) | |
| *B33Y 10/00* | (2015.01) | |
| *B33Y 30/00* | (2015.01) | |
| *B33Y 50/02* | (2015.01) | |

(52) U.S. Cl.
CPC ........ *B23K 26/0622* (2015.10); *B23K 26/066* (2015.10); *B23K 26/342* (2015.10); *B29C 64/153* (2017.08); *B29C 64/282* (2017.08); *B29C 64/286* (2017.08); *B33Y 10/00* (2014.12); *B33Y 30/00* (2014.12); *B22F 10/10* (2021.01); *B22F 10/362* (2021.01); *B22F 10/366* (2021.01); *B33Y 50/02* (2014.12); *Y02P 10/25* (2015.11)

(58) Field of Classification Search
CPC .............. B23K 26/0622; B23K 26/066; B23K 26/342; B29C 64/153; B29C 64/273; B29C 64/282; B29C 64/286; B33Y 10/00; B33Y 30/00; B33Y 50/02; Y02P 10/25

See application file for complete search history.

(56) References Cited

U.S. PATENT DOCUMENTS

| | | |
|---|---|---|
| 5,272,309 A | 12/1993 | Goruganthu et al. |
| 5,314,003 A | 5/1994 | Mackay |
| 5,382,308 A | 1/1995 | Bourell et al. |
| 5,640,667 A | 6/1997 | Freitag et al. |
| 5,674,414 A | 10/1997 | Schweizer |
| 10,000,023 B2 | 6/2018 | El-Siblani et al. |
| 10,220,471 B2 | 3/2019 | Khairallah |
| 10,376,987 B2 | 8/2019 | DeMuth et al. |
| 2005/0098548 A1* | 5/2005 | Kobayashi ........... B23K 26/067 219/121.73 |
| 2009/0221422 A1 | 9/2009 | Miller |
| 2010/0176539 A1 | 7/2010 | Higashi et al. |
| 2011/0019705 A1 | 1/2011 | Adams et al. |
| 2011/0033887 A1 | 2/2011 | Fang et al. |
| 2011/0278269 A1 | 11/2011 | Gold et al. |
| 2013/0102447 A1 | 4/2013 | Strong et al. |
| 2013/0136868 A1 | 5/2013 | Bruck et al. |
| 2013/0271800 A1 | 10/2013 | Kanugo |
| 2013/0300286 A1 | 11/2013 | Ljungblad et al. |
| 2013/0302533 A1 | 11/2013 | Bruck |
| 2014/0085631 A1 | 3/2014 | Lacour et al. |
| 2014/0252687 A1 | 9/2014 | El-Dasher et al. |
| 2014/0271965 A1 | 9/2014 | Ferrar |
| 2014/0367894 A1 | 12/2014 | Kramer et al. |
| 2015/0132173 A1 | 5/2015 | Bruck et al. |
| 2015/0202716 A1 | 7/2015 | Bruck et al. |
| 2015/0211083 A1 | 7/2015 | Gabilondo et al. |
| 2015/0273632 A1 | 10/2015 | Chen |
| 2015/0283614 A1 | 10/2015 | Wu et al. |
| 2015/0311064 A1 | 10/2015 | Stuart et al. |
| 2015/0343664 A1 | 12/2015 | Liu |
| 2015/0360418 A1 | 12/2015 | Shah et al. |
| 2015/0367415 A1 | 12/2015 | Buller et al. |
| 2016/0175935 A1 | 6/2016 | Ladewig et al. |
| 2016/0236279 A1 | 8/2016 | Ashton et al. |
| 2016/0322777 A1 | 11/2016 | Zediker et al. |
| 2017/0144371 A1 | 5/2017 | Lussier et al. |

FOREIGN PATENT DOCUMENTS

| | | |
|---|---|---|
| WO | 2015108991 A2 | 7/2015 |
| WO | 2015120168 A1 | 8/2015 |

\* cited by examiner

LASER PULSE SHAPING FOR ADDITIVE MANUFACTURING

CROSS-REFERENCE TO RELATED APPLICATIONS

This application is a divisional of and claims priority of U.S. patent application Ser. No. 17/984,786, filed Nov. 10, 2022 (now allowed), which is a divisional of U.S. patent application Ser. No. 16/538,152, filed Aug. 12, 2019 (U.S. Pat. No. 11,524,458) which is a divisional of and claims priority of U.S. patent application Ser. No. 15/010,107, filed Jan. 29, 2016 (U.S. Pat. No. 10,376,987). Related disclosure is included in U.S. patent application Ser. No. 14/882,762 entitled "Spatter Reduction Laser Scanning Strategy In Selective Laser Melting", filed Oct. 14, 2015 (U.S. Pat. No. 10,220,471). The entire disclosures of each of the above applications are incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field of Endeavor

The present application relates to the art of melting powdered material through laser pulse shaping, a technique which can be applied to additive manufacturing to create three-dimensional parts.

State of Technology

This section provides background information related to the present disclosure which is not necessarily prior art.

U.S. Pat. No. 4,944,817 for multiple material systems for selective beam sintering issued Jul. 31, 1990 to David L. Bourell et al. and assigned to Board of Regents, The University of Texas System provides the state of technology information reproduced below.

A method and apparatus for selectively sintering a layer of powder to produce a part comprising a plurality of sintered layers. The apparatus includes a computer controlling a laser to direct the laser energy onto the powder to produce a sintered mass. The computer either determines or is programmed with the boundaries of the desired cross-sectional regions of the part. For each cross-section, the aim of the laser beam is scanned over a layer of powder and the beam is switched on to sinter only the powder within the boundaries of the cross-section. Powder is applied and successive layers sintered until a completed part is formed.

U.S. Pat. No. 5,155,324 for a method for selective laser sintering with layerwise cross-scanning issued Oct. 12, 1992 to Carl R. Deckard et al., University of Texas at Austin, provides the state of technology information reproduced below.

Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

United States Published Patent Application No. 2014/0252687 for a system and method for high power diode based additive manufacturing by Bassem S. El-Dasher; Andrew Bayramian; James A. Demuth; Joseph C. Farmer; and; Sharon G. Torres; published Sep. 11, 2014 and assigned to Lawrence Livermore National Security, LLC provides the state of technology information reproduced below.

A system is disclosed for performing an Additive Manufacturing (AM) fabrication process on a powdered material forming a substrate. The system may make use of a diode array for generating an optical signal sufficient to melt a powdered material of the substrate. A mask may be used for preventing a first predetermined portion of the optical signal from reaching the substrate, while allowing a second predetermined portion to reach the substrate. At least one processor may be used for controlling an output of the diode array.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, methods, and systems utilizes one or more pulsed lasers to melt and allow to re-solidify areas of powdered material by overcoming the kinetics of powder agglomeration through a pulse shape consisting of a low intensity portion and a high intensity portion by melting the powder, and partially melting the substrate at the interface surface between the powder and the substrate such that both the powder and the interface layer of the substrate have been melted before surface tension can take effect on the now molten powder particles. Without the proper temporal pulse profile, the powder particles would melt first, and then surface tension would pull them together into an unpatterned blob; however, by employing the inventor's apparatus, powder particles and the interface layer of the base substrate are melted before surface tension can take any detrimental effects, allowing for successful printing.

This process can be applied for the purposes of additive manufacturing, and can also enable the printing of large patterned areas of powder in single shot such as in Diode Additive Manufacturing (DiAM) and repeating the process to build up layers which constitute the part to be manufactured. The current embodiment of this invention has shown the ability in the laboratory to overcome the surface tension effects during the melting process and to create patterned images in a single laser shot.

Current powder bed fusion additive manufacturing systems (EOS, Concept Laser, etc.) use one or more 100-1,000 W lasers to melt layers of powdered material by scanning the laser over the substrate, melting the powder and bonding it to the base in a 2D pattern. A new layer of powder is then spread across the layer and a new arbitrary pattern is applied to the powder using the laser. These lasers are typically continuous wave systems, and thus are scanned around the build platform with some spot size, power, and velocity that is material dependent in order to achieve the correct melt characteristics.

The inventor's apparatus, methods, and systems produce entire layers (or macroscopic areas) in a single shot that are sub-patterned with hundreds to >millions of pixels. The inventor's apparatus, methods, and systems have the potential to dramatically decrease the cost to producing additively manufactured parts, enabling the move from prototyping/high value production to mass manufacturing.

One embodiment of the inventor's method for fusing large areas of layered powder into solid material and bonding it to a substrate includes the steps of providing a substrate, positioning a first layer of powder particles on said substrate producing a first interface between said first layer of powder particles and said substrate, producing a first data file defining a planar cross section of the first area to be printed, providing one or more lasers that either can be combined to produce a temporally varying bonding pulsed laser beam, providing a mask such as an optically addressed light valve that is transparent to said portion of said bonding pulsed laser beam, where the mask contains data from said first data file, and directing said bonding pulsed laser beam having a portion containing said first data file onto said first layer of powder particles on said substrate, melting said first layer of powder particles and the said substrate at said interface to bond said first layer of powder particles to said substrate before surface tension can affect the printed image.

One embodiment of the inventor's additive manufacturing apparatus for fusing large areas of layered powder into solid material and bonding it to a substrate includes providing a substrate, positioning a first layer of powder particles on said substrate producing a first interface between said first layer of powder particles and said substrate, producing a first data file defining a planar cross section of the first area to be printed, providing one or more lasers that either can be combined to produce a temporally varying bonding pulsed laser beam, providing a mask such as an optically addressed light valve that is transparent to said portion of said bonding pulsed laser beam, where the mask contains data from said first data file, and directing said bonding pulsed laser beam having a portion containing said first data file onto said first layer of powder particles on said substrate melting said first layer of powder particles and the said substrate at said interface to bond said first layer of powder particles to said substrate before surface tension can affect the printed image.

The inventor's apparatus, systems, and methods have a number of advantages. For example, they can perform laser printing of powder with much less spatter and produce more uniform melt. In the prior art systems spatter landing on a freshly consolidated melt track can form an incomplete weld with that surface. This can prevent a uniform powder spreading on top of the consolidated melt track. The outcome can be the creation of porosities, which is detrimental to the part quality.

The powder used in SLM is expensive. With the inventor's apparatus, systems, and methods spatter is minimized, the powder particle distribution will remain the same after multiple uses, hence, improving the re-use (recyclability) of the powder and minimizing waste.

Another advantage of the invention is to produce large macroscopic areas of fused material in a single shot. This has the ability to reduce thermally induced stress concentrations, and to reduce thermal warpage when additively manufacturing parts. Furthermore, by patterning a large beam for the purposes of additive manufacturing, the system is far more scalable than using a single point laser and scanning it to create the image, and production rates can be increased virtually without limit.

In another aspect the present disclosure relates to a method involving a substrate having an interface layer, wherein the interface layer forms only an upper surface portion of the substrate, and a feedstock material placed on the interface layer. The method may comprise generating, using a laser system, a first beam component providing a first power flux level. The method may further comprise generating, using the laser system, a second beam component providing a second power flux level which is greater than said first power flux level. The method may further comprise heating the feedstock material to a first level short of a melting point of the feedstock material, using the first beam component, at which point the particles of the feedstock material begin to experience surface tension forces relative to the interface layer of the substrate. The method may further comprise heating the particles of feedstock material to a second level to melt the feedstock material and also to melt the interface layer of the substrate, wherein the interface layer of the substrate comprises a layer having a thickness less than a full thickness of the substrate, such that a portion of the interface layer remains unmelted by the second beam component as the particles of feedstock material and the interface layer are bonded together. The method may further include configuring the laser system such that the second beam component has a duration less than the first beam component by a factor of at least $1\times10^{-3}$, and a power controlled to be sufficient only to melt the interface layer of the substrate.

In another aspect the present disclosure relates to a method involving a substrate having an interface layer, wherein the interface layer forms only an upper surface portion of the substrate, and a feedstock material placed on the interface layer. The method may comprise generating, using a first laser, a first beam component providing a first power flux level, and then generating, using a second laser, a second beam component providing a second power flux level which is greater than said first power flux level. The method may further include using a mask configured between the feedstock material and the first and second lasers to produce a 2D optical image using the first and second beam components. The method may further include heating the feedstock material to a first level short of a melting point of the feedstock material, using the first beam component, at which point the particles of the feedstock material begin to experience surface tension forces relative to the interface layer of the substrate. The method may further include further heating the particles of feedstock material to a second level to melt the feedstock material and also to melt the interface layer of the substrate, wherein the interface layer of the substrate comprises a layer having a thickness less than a full thickness of the substrate, such that a portion of the interface layer remains unmelted by the second beam component as the particles of feedstock material and the interface layer are bonded together in accordance with the 2D optical pattern. The method may further include configuring the laser system such that the second beam component has a duration less than the first beam component by a factor of at least $1\times10^{-3}$, and a power controlled to be sufficient only to melt the interface layer of the substrate.

In still another aspect the present disclosure relates to a method involving a substrate having an interface layer, wherein the interface layer forms only an upper surface portion of the substrate, and a feedstock material placed on the interface layer. The method may comprise generating, using a first laser, a first beam component providing a first power flux level, and generating, using a second laser, a second beam component providing a second power flux level which is greater than said first power flux level. The method may further include using a mask configured between the feedstock material and the first and second lasers to produce a 2D optical image using the first and second beam components. The method may further include heating the feedstock material to a first level short of a melting point of the feedstock material, using the first beam component, at which point the particles of the feedstock material begin to experience surface tension forces relative to the interface layer of the substrate. The method may further include heating the particles of feedstock material to a second level to melt the feedstock material and also to melt the interface layer of the substrate, wherein the interface layer of the substrate comprises a layer having a thickness less than a full thickness of the substrate, such that a portion of the interface layer remains unmelted by the second beam component as the particles of feedstock material and the interface layer are bonded together in accordance with the 2D optical pattern. The method may further include further configuring the laser system such that the second beam component has a duration less than the first beam component by a factor of at least $1\times10^{-3}$, and a power controlled to be in a MW range in order to only melt the interface layer of the substrate.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
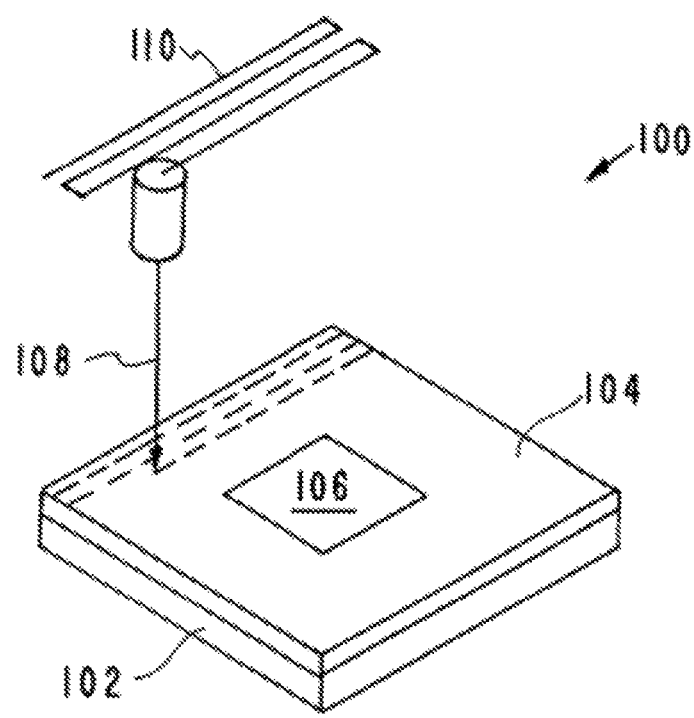
FIG. 1 illustrates a prior art additive manufacturing system.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Additive manufacturing is changing the way the world makes things. It is on brink of being able to increase to production rates relative to mass manufacturing, but is still currently stuck in the prototyping/high-value-only product creation phase. There are many types of additive manufacturing, but one of the most precise systems that can handle the widest variety of materials (plastics, ceramics, and metals) is powder bed fusion (also known as DMLS, SLS, SLM, etc. each company brands it with their own name, but the common method description is all powder bed fusion). Current powder bed fusion additive manufacturing systems (EOS, Concept Laser, etc.) use 100-1,000 W fiber lasers (typically 1-4) to melt layers of powdered material by scanning the laser over the substrate, melting the powder and bonding it to the base in a 2D pattern. A new layer of powder is the spread across the layer and a new arbitrary pattern is applied to the powder using the laser. These lasers are typically continuous wave systems, and thus are scanned around the build platform with some spot size, power, and velocity that is material dependent in order to achieve the correct melt characteristics.

The inventor's additive manufacturing system uses a temporally modulated laser beam to selectively fuse a layer of powder. One embodiment of this method is to produce a 3D printed part wherein the part comprises a plurality of fused layers. The system includes a computer controlling the output of one or more lasers such that a time varying photon flux illuminates the desired powder particles to successfully perform the melting operation, bonding the powder to the substrate beneath to produce a fused mass.

One embodiment of the invention uses low cost diode lasers to produce a low intensity (containing kilowatts of power) photon flux component over long duration (milliseconds), and a solid state pulsed (often referred to as Q-switched) Nd:YLF laser to produce a high intensity component (containing milli-Joules to Joules of energy) over a short duration (microseconds to nanoseconds). By delivering the majority of the energy with diode lasers, the bulk of the laser light can be generated using a low cost photon source. Utilizing the higher intensity pulsed laser to deliver the final burst of energy, surface tension forces are able to be overcome to successfully melt the powder and bond it to the layer below.

The embodiment used to reduce this invention to practice consisted of a low intensity fluence (LIF) of 5.6 kW generated by diode lasers illuminating an area of 5 mm by 5 mm. The high intensity fluence (HIF) of <1 Joule was generated by a solid state Q-switched Nd:YLF laser co-linear with the diode laser beam. An optically addressed light valve (a type of mask) was used to create a pattern in both the LIF and HIF beams to create a 2D plane of melted metal in the desired pattern that was fused to the substrate below it. This fused mass includes consolidated material produced by the laser energy that passes through the area of the mask that is transparent to the laser diode beams. The portion of the fused mass that is left unconsolidated is that portion outside of the laser energy that passes through the transparent area of the mask. The unconsolidated material is that area untouched by the diode beams. The unconsolidated material corresponds to the area of the mask not transparent to the laser diode beam. The system utilizes an optically addressed light valve (OALV) having first and second components. The first component represents the digital image of the first 2D layer and the second component represents the portion of the light beam that is outside of the digital image of the first 2D layer. The two components are directed to the light valve system that acts as a dynamic mask and allows the portion containing the digital image of the first 2D layer to pass while blocking the component that is outside of the digital image of the first 2D layer. In one embodiment, the mask comprises a controllable liquid crystal polarization rotator comprising a liquid crystal display (LCD) positioned upstream of a polarizing element, relative to a direction of travel of the laser energy.

Referring now to the drawings, and in particular to FIG. 1, a prior art additive manufacturing system is illustrated. The prior art additive manufacturing system is designated generally by the reference numeral 100. A print head directs a projected beam 108 onto metal powder particles 104 that have been deposited on a substrate 102. The print head and projected beam 108 move according to a predetermined raster pattern 110 that produces the consolidated mass of metal powder particles 104 according to the digital image of the first 2D layer. The projected beam 108 solidifies the metal powder particles 104 according to the digital image of the first 2D layer information. The portion 106 of the mass of metal powder particles outside of the consolidated mass of metal powder particles 104 is designated as the unconsolidated mass of metal powder particles 106.

Once the first layer of consolidated mass of metal powder particles 104 is completed, production of the second layer of the product is started. A second layer of metal powder particles is applied on top of the completed first layer of metal powder particles 104. This procedure is continued by repeating the steps and building the final product in a layer by layer process.

Figure 2A:
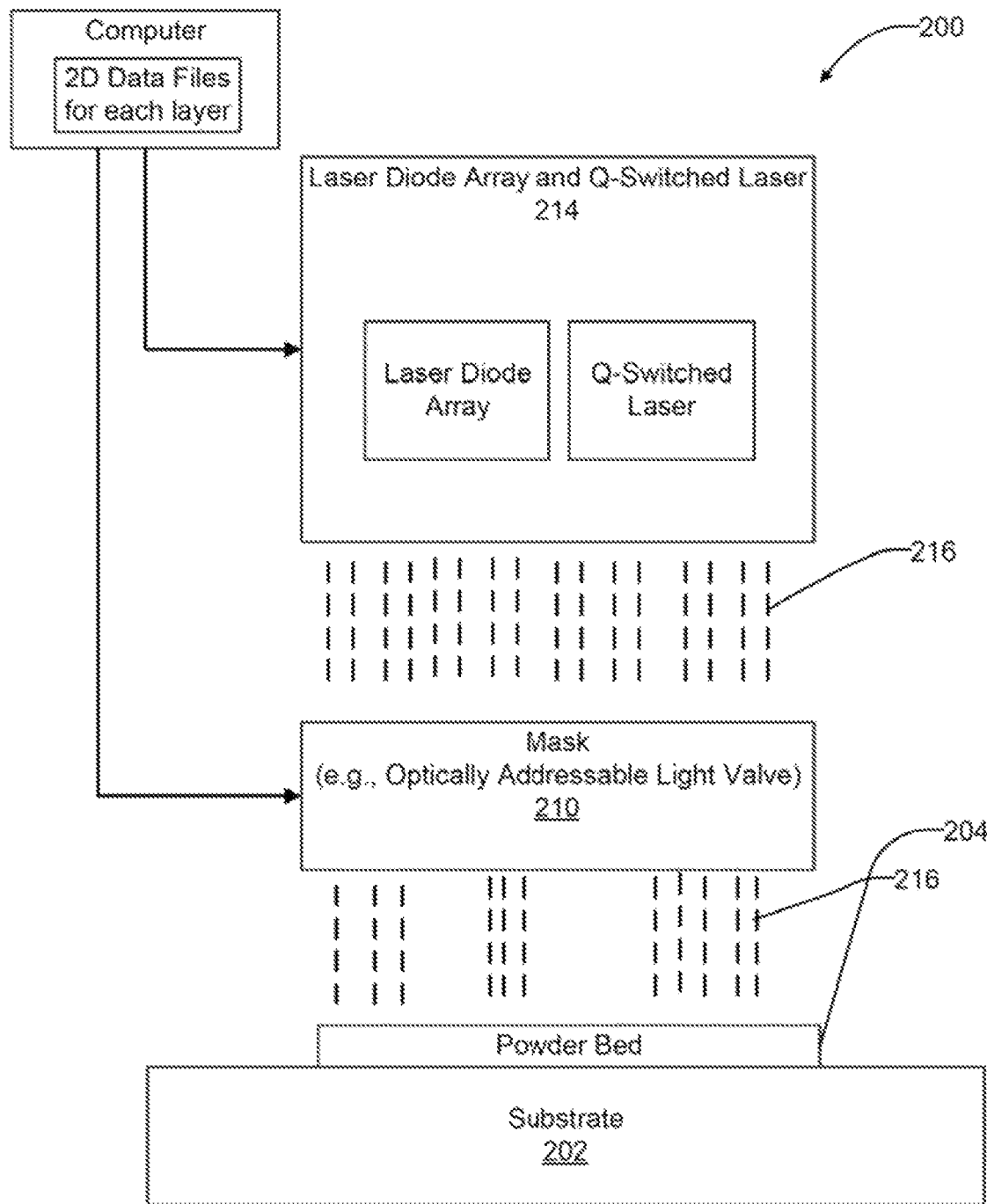
FIG. 2A is a high level block diagram of an example of one embodiment of a system in accordance with the present invention.
Figure 2B:
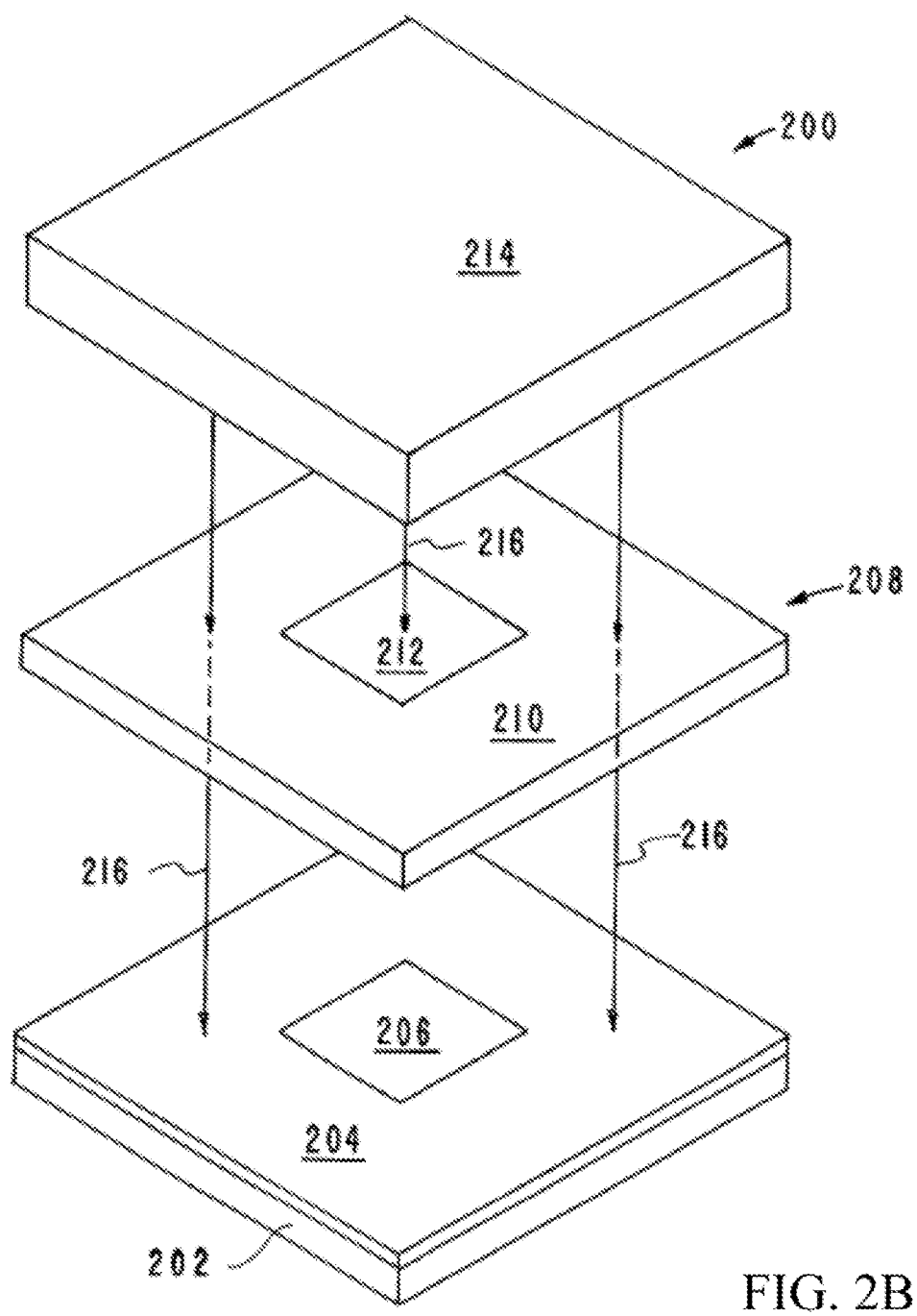
FIG. 2B illustrates an embodiment of the inventor's additive manufacturing apparatus, systems, and methods from a spatial perspective.

Referring now to FIGS. 2A and 2B, an embodiment of the inventor's additive manufacturing apparatus, systems, and methods is illustrated. The embodiment is designated generally by the reference numeral 200. The embodiment 200 utilizes a pulsed laser to overcome the kinetics condition by delivering a pulse of laser energy before the powder is melted to allow it to bond to the base. Not only can the pulsed laser allow for the use of lower diode power fluxes, but it also allows for incredibly fine resolution to be achieved. Part resolution limits that are based on thermal diffusion in the powder bed scale with the time the energy is applied. The use of the solid state Q-switched laser provides nano-second time scales and can generate nano-meter scale resolution. The embodiment 200 uses a diode pulse in milliseconds, followed by a short pulse from the Q-switched laser in nanoseconds. The embodiment 200 includes the components listed and described below.

Substrate 202.
First powder particles layer 204.
Unconsolidated material 206.
Selective area mask 208.
Optically addressed light valve (OALV) 210/212.
Area of Mask transparent to laser diode beams 210.
Area of Mask not transparent to laser diode beams 212.
Diode array and Q-switched laser 214.
Diode and Q-switched laser beam producing laser energy 216.

The embodiment 200 is an additive manufacturing system for selectively fusing a layer of powder to produce a part wherein the part comprises a plurality of fused layers. The system includes a computer controlling a laser diode array and Q-switched laser 214 to direct the laser energy 216 onto powder in the powder bed to produce a fused mass. The fused mass includes consolidated material made from the first powder particles 204, which is produced by the laser energy 216 that passes through the area 210 of the mask that is transparent to the laser energy 216. The portion of the fused mass that is left as unconsolidated material 206 is that portion outside of the laser energy 216 that passes through the area 210 of the mask. The unconsolidated material 206 is that area untouched by the laser energy 216. The unconsolidated material 206 corresponds to the area 212 of the mask not transparent to laser energy 216. The embodiment 200 utilizes pulses from the diode array and Q-switched laser 214 to produce the laser energy 216 that is delivered before the powder is melted to allow it to bond to the base.

The computer controller performs various operations of the system 200. Initially a 3D model of the desired product is designed by any suitable method, e.g., by bit mapping or by computer aided design (CAD) software at a PC/controller. The CAD model of the desired product is electronically sliced into series of 2-dimensional data files, i.e., 2D layers, each defining a planar cross section through the model of the desired product. The 2-dimensional data files are stored in a computer and provide a digital image of the final product.

The digital images are used in the additive manufacturing system 200 to produce the final product. Solidified powder particles are applied to a substrate in a layer by layer process to produce the final product. The digital image of the first 2D layer is used to produce the first layer of the desired product. The digital image of the first 2D layer is used to create a mask that only allows the desired portion of the laser beam to pass through the optically addressed light valve (OALV).

A delivery system directs metal powder particles onto substrate 202. The system 200 utilizes a pulse or pulses from the diode array and Q-switched laser 214 to produce a pulsed diode beam, and then later a Q-switched laser beam, creating the laser energy 216 that is delivered before the powder is fully melted by the diode lasers such that the first layer of powder particles and the first layer of the substrate 202 melt, and are bonded together. Additional layers of powder are then added onto the first layer and the process is repeated.

The system's computer either determines or is programmed with the boundaries of the desired cross-sectional regions of the part. For each cross-section, laser diode beam and Q-switched laser energy 216 is arranged to be projected onto a layer of powder particles and the laser energy 216 is switched on to fuse only the powder within the boundaries of the cross-section 204. Powder particles are applied and successive layers fused until a completed part is formed.

The system utilizes a light valve system (Optically addressed light valve (OALV) 210/212) producing the area 210 of the mask that is transparent to the laser energy 216 and producing the area 212 of the mask that rejects the laser energy 216.

The light valve system provides first and second components. The first component is reprinted by laser energy 216, which represents the digital image of the first 2D layer, and the second component is the area 212, which represents the portion of the light beam that is outside of the digital image of the first 2D layer. The two components are directed to the light valve system that acts as a dynamic mask and allows the portion containing the digital image of the first 2D layer to pass while rejecting the component that is outside of the digital image of the first 2D layer. Additional details of patterning high energy lasers, and the light valve system are provided in a co-pending patent application published as U.S. Published Patent Application No. 2014/0252687 for System and Method For High Power Diode Based Additive Manufacturing. The disclosure of U.S. Published Patent Application No. 2014/0252687 is incorporated herein by this reference.

The first layer 204 of powder particles is bonded to the substrate 202 by a bonding pulsed laser beam 216 (containing both diode laser and Q-switched laser beams) heating and melting the first layer 204 of powder particles and the substrate at the interface between the first layer 204 of powder particles and the substrate 202.

A diode laser creates the beam that generates the laser energy 216, which is incident on the light valve system 208 where the image to be printed is imbedded in the beam. The first 2D layer is then projected from the light valve system onto the layer 204 of metal powder particles that has been deposited on the substrate 202. The projected diode laser beam, using the laser energy 216, heats up the metal powder particles in a pattern according to the digital image of the first 2D layer information, bringing the patterned image up close to the melting point of the powdered material.

A q-switched pulsed laser beam provides energy to help form laser energy 216, and is incident on the light valve system 208 where the image to be printed is imbedded in the beam. The first 2D layer is then projected from the light valve system onto the layer 204 of metal powder particles that has been deposited on the substrate 202. The projected q-switched laser beam provides the remaining energy required to melt the metal powder particles and the interface layer of the substrate 202 in a pattern according to the digital image of the first 2D layer information, melting the powder forming the patterned image and the substrate below it.

Once the first layer 204 is completed, production of the second layer of the product is started. A second layer of metal powder particles is applied on top of the competed first layer 204. The second layer of powder particles is bonded to the first layer 204 of the product by a bonding pulsed laser beam heating and melting the second layer of powder particles and melting the first layer 204 at the interface between the second layer of powder particles and the first layer 204.

Figure 3:
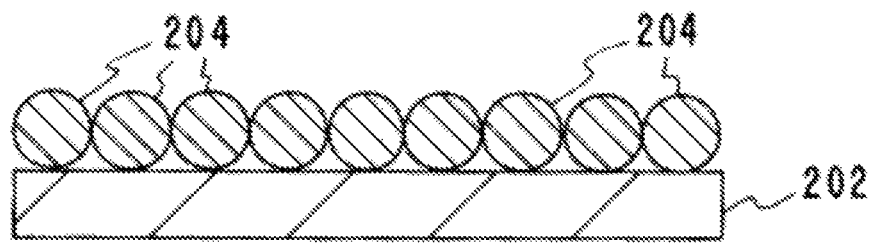
FIG. 3 shows a first layer of powder particles applied to the substrate with an interface between the first layer of powder particles and the substrate.

The inventor's apparatus, systems, and methods utilize time dependent shaping of the laser pulse to overcome a kinetics barrier in the physics of powder melting in order to bond the powder to the base. One embodiment of the invention is as used in the additive manufacturing processes to construct nearly any material that can be melted and some that cannot (like some ceramics) but that the heating process allows them to fuse. The pulsed laser can deliver the required energy either before, during, or after powder melting, but in all cases before the surface tension forces of the molten powder can distort the printed image by pulling the molten powder together to lower the total surface energy. The additive manufacturing system begins with a layer of powder being spread across the substrate. As illustrated in FIG. 3, the first layer of powder particles 204 are applied to substrate 202. The inventor found that the condition existed where the powder particles 204 would melt and ball up but not bond to the substrate 202 if the laser flux was not high enough. The inventor discovered that by using a correctly shaped pulsed laser beam, the effect of surface tension forces on the molten particles could be overcome by delivering an additional pulse of laser energy before the powder particles 204 were fully melted to allow the powder particles 204 to be melted at the interface between the particles and substrate thereby bonding the particles 204 to the substrate 202.

Figure 4:
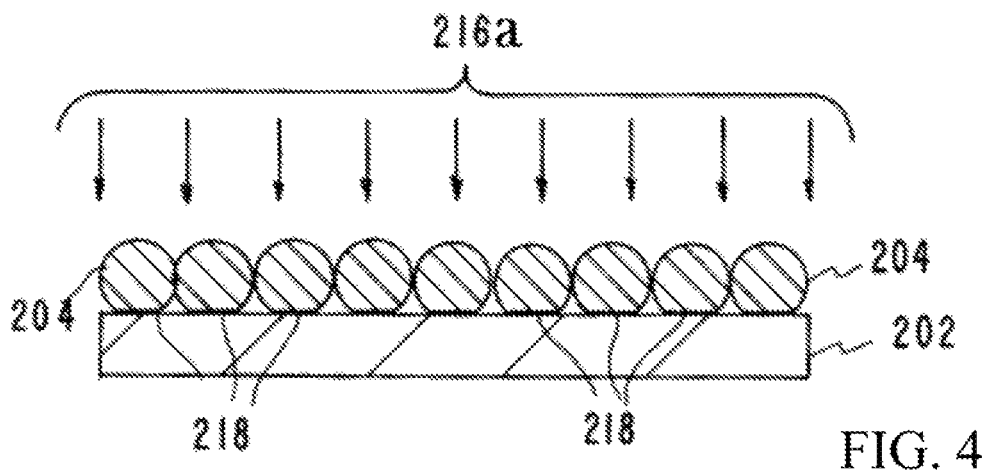
FIG. 4 shows a bonding laser beam heating and melting the first layer of powder particles and melting the substrate at the interface between the first layer of powder particles and the substrate.

Referring now to FIG. 4, a pulsed diode laser beam 216a is shown heating and melting the first layer of powder particles 204, but not melting the substrate 202 at interface 218.

Figure 5:
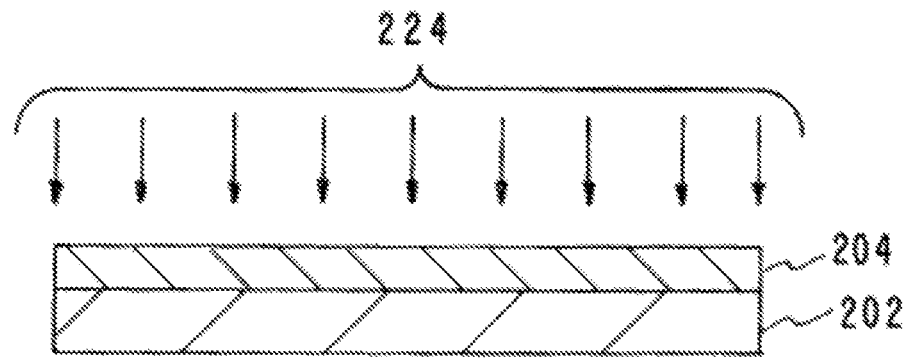
FIG. 5 shows a laser beam heating the first layer of now melted powder particles to form the first layer of the product.

Referring now to FIG. 5 an additional q-switched pulsed laser beam 224 with ns duration containing MW of power, is shown heating the first layer of powder particles and delivering sufficient energy to melt the first layer of powder particles and the interface layer 218 of FIG. 4 such that the melted particles adhere to the substrate layer 202 to form the first layer 204 of the product that has been bonded to the substrate 202.

Figure 6:
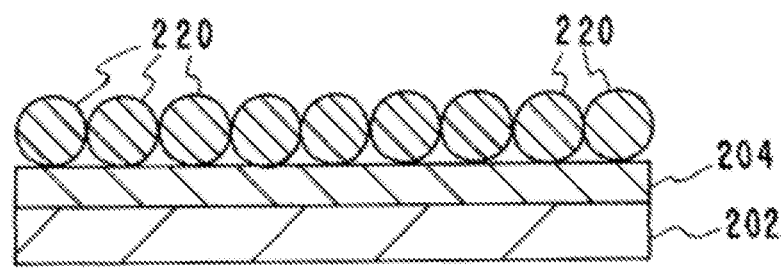
FIG. 6 shows a second layer of powder particles applied to the first layer of the product with an interface between the second layer of powder particles and the first solidified layer previously consisting of powder particles.

Once the first layer 204 is completed production of the second layer of the product is started. As illustrated in FIG. 6, a second layer of powder particles 220 are applied to the first layer 204 of the product with an interface between the second layer of powder particles 220 and the first layer 204 of the product.

Figure 7:
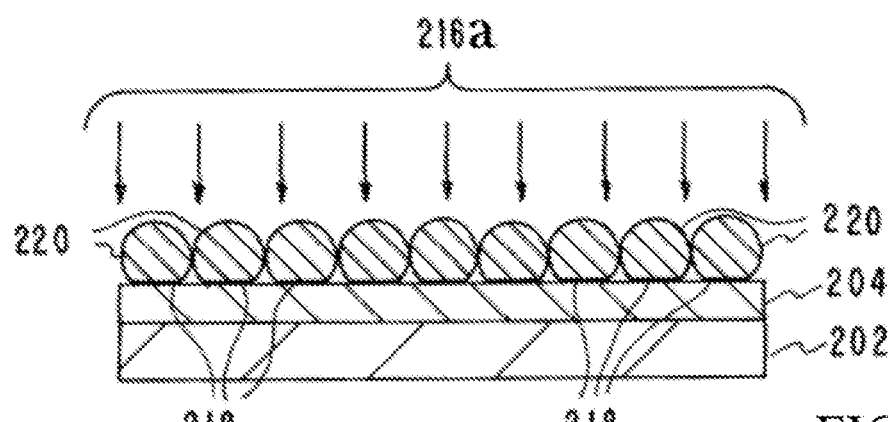
FIG. 7 shows a bonding laser beam heating and melting the second layer of powder particles and melting the first layer of the product at the interface between the second layer of powder particles and the first layer of the product.

Referring now to FIG. 7, the pulsed diode laser beam 216a is shown heating and melting the second layer of powder particles 220, but not melting the first layer 204 at interface 218.

Figure 8:
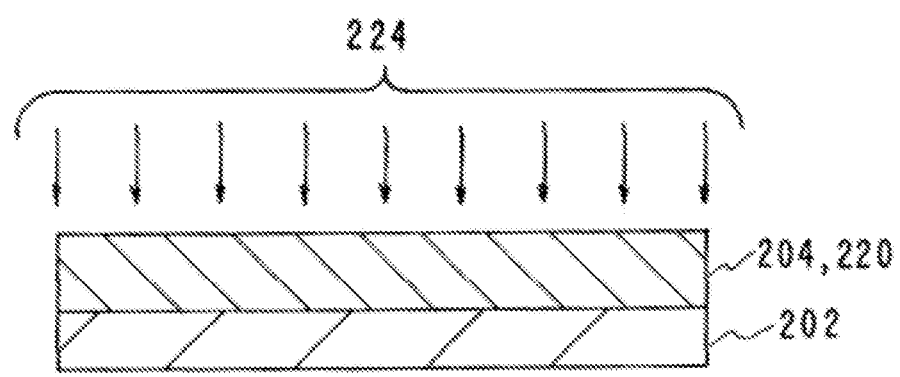
FIG. 8 shows a laser beam heating the second layer of now melted powder particles to form the second layer of the product.

Referring now to FIG. 8, the additional q-switched pulsed laser beam 224 with ns duration containing MW of power, is shown heating the first layer 204 of powder particles and delivering sufficient energy to melt the first layer of powder particles and the interface layer 218 of FIG. 7 such that the melted particles adhere to the first layer 204 to form the first layer 220 of the product that has been bonded to the substrate 202.

The inventors' apparatus, systems, and methods provide an additive manufacturing pulsed laser that enables the printing of large areas of powder in single shot either by itself or in conjunction with another laser, overcoming the kinetics of powder agglomeration by shaping of the laser pulse enabling melting of the base substrate before surface tension can take effect. The system utilizes a mask such as an optically addressed light valve (OALV) having first mask and second mask components. The fused mass includes consolidated material produced by the laser energy that passes through the first mask component area of the mask that is transparent to the laser diode beams. The portion of the fused mass that is left unconsolidated is that outside of the laser energy that passes through the second mask component area of the mask.

Figure 9:
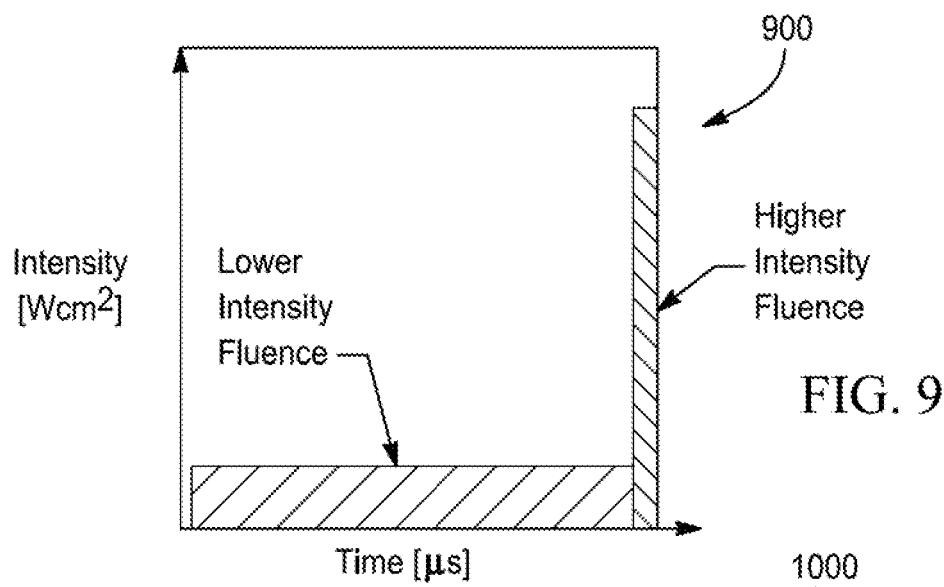
FIG. 9 is a graph illustrating an embodiment of the inventor's additive manufacturing apparatus, systems, and methods from a temporal perspective.

Referring now to FIG. 9 a graph illustrates an embodiment of the inventor's additive manufacturing apparatus, systems, and methods. The graph is designated generally by the reference numeral 900. The inventor's additive manufacturing apparatus, systems, and methods use a temporally modulated laser beam to selectively fuse a layer of powder. The graph 900 illustrates the inventors' system from a temporal perspective where the pulses in superposition are synced at their end points.

Figure 10:
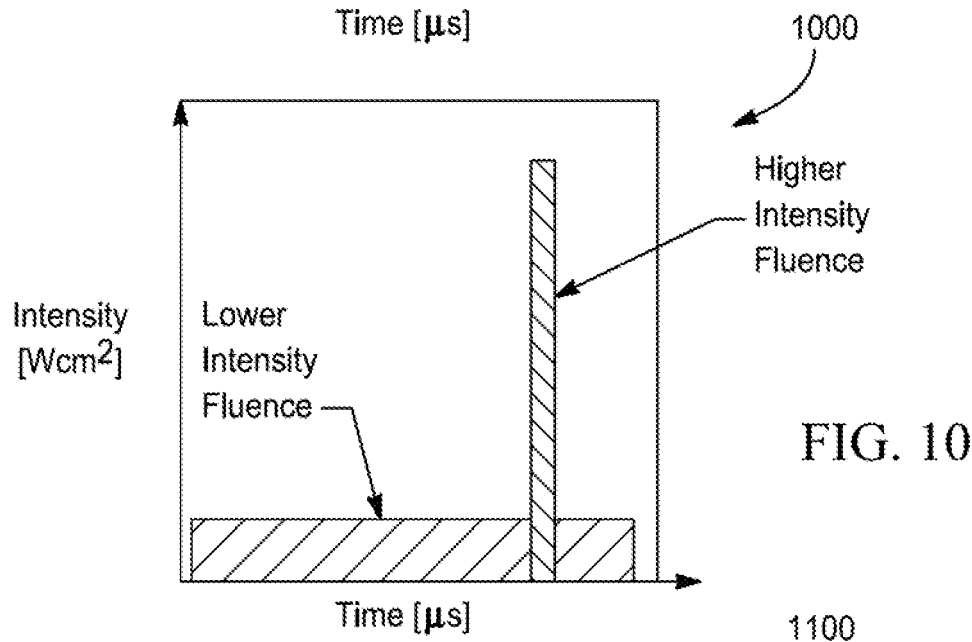
FIG. 10 is a graph illustrating another embodiment of the inventor's additive manufacturing apparatus, systems, and methods from a temporal perspective.

Referring now to FIG. 10 a graph illustrates another embodiment of the inventor's additive manufacturing apparatus, systems, and methods. The graph is designated generally by the reference numeral 1000. The inventor's additive manufacturing apparatus, systems, and methods use a temporally modulated laser beam to selectively fuse a layer of powder. The graph 1000 illustrates the inventors' system from a temporal perspective where the pulses in superposition are overlapped.

Figure 11:
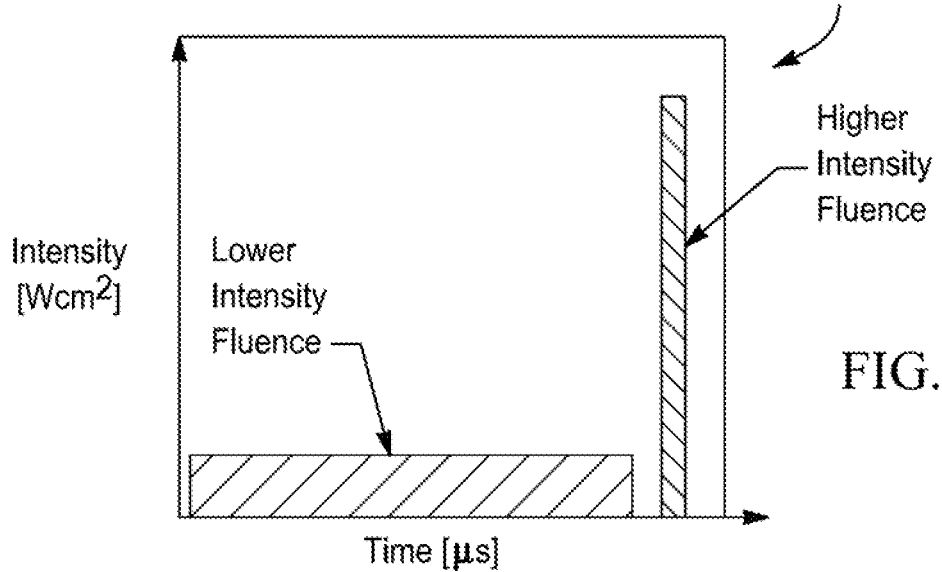
FIG. 11 is a graph illustrating yet another embodiment of the inventor's additive manufacturing apparatus, systems, and methods from a temporal perspective.

Referring now to FIG. 11 a graph illustrates yet another embodiment of the inventor's additive manufacturing apparatus, systems, and methods. The graph is designated generally by the reference numeral 1100. The inventor's additive manufacturing apparatus, systems, and methods use a temporally modulated laser beam to selectively fuse a layer of powder. The graph 1100 illustrates the inventors' system from a temporal perspective where the pulses in superposition are non-overlapped.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

What is claimed is:

1. A method involving a substrate having an interface layer, wherein the interface layer forms only an upper surface portion of the substrate, and a feedstock material placed on the interface layer, the method comprising:

generating, using a laser system, a first beam component providing a first power flux level;

generating, using the laser system, a second beam component providing a second power flux level which is greater than said first power flux level;

heating the feedstock material to a first level short of a melting point of the feedstock material, using the first beam component, at which point the particles of the feedstock material begin to experience surface tension forces relative to the interface layer of the substrate;

further heating the particles of feedstock material to a second level to melt the feedstock material and also to melt the interface layer of the substrate, wherein the interface layer of the substrate comprises a layer having a thickness less than a full thickness of the substrate, such that a portion of the interface layer remains unmelted by the second beam component as the particles of feedstock material and the interface layer are bonded together; and configuring the laser system such that the second beam component has a duration less than the first beam component by a factor of at least $1 \times 10^{-3}$, and a power controlled to be sufficient only to melt the interface layer of the substrate.

2. The method of claim 1, wherein using a laser system to generate the first and second beam components comprises using a first laser to generate the first beam component, and a second laser to generate the second beam component.

3. The method of claim 2, wherein using a first laser to generate the first beam component comprises using a laser diode array.

4. The method of claim 2, where using a second laser to generate the second beam component comprises using aa Q-switched laser.

5. The method of claim 1, wherein the first beam component comprises a temporally varying beam pulse.

6. The method of claim 1, wherein the second beam component comprises a temporally varying beam pulse.

7. The method of claim 1, wherein the first beam component has a duration of milliseconds.

8. The method of claim 1, wherein said generating, using a laser system, the second beam component, comprises using a pulsed solid state laser for generating the second beam component.

9. The method of claim 1, further comprising using a mask configured between the laser system and the feedstock material for creating an optical pattern to selectively sinter only portions of the feedstock layer to the interface layer.

10. The method of claim 9, wherein the mask produces a 2D optical pattern according to which the feedstock layer is sintered to the interface layer.

11. The method of claim 10, wherein the mask is dynamically controlled by a controller to produce the 2D optical pattern.

12. A method involving a substrate having an interface layer, wherein the interface layer forms only an upper surface portion of the substrate, and a feedstock material placed on the interface layer, the method comprising:

generating, using a first laser, a first beam component providing a first power flux level;

generating, using a second laser, a second beam component providing a second power flux level which is greater than said first power flux level;

using a mask configured between the feedstock material and the first and second lasers to produce a 2D optical image using the first and second beam components;

heating the feedstock material to a first level short of a melting point of the feedstock material, using the first beam component, at which point the particles of the feedstock material begin to experience surface tension forces relative to the interface layer of the substrate;

further heating the particles of feedstock material to a second level to melt the feedstock material and also to melt the interface layer of the substrate, wherein the interface layer of the substrate comprises a layer having a thickness less than a full thickness of the substrate, such that a portion of the interface layer remains unmelted by the second beam component as the particles of feedstock material and the interface layer are bonded together in accordance with the 2D optical pattern; and configuring the laser system such that the second beam component has a duration less than the first beam component by a factor of at least $1 \times 10^{-3}$, and a power controlled to be sufficient only to melt the interface layer of the substrate.

13. The method of claim 12, wherein said using a first laser comprises using a diode laser, and the first power flux level is on an order of kilowatts.

14. The method of claim 13, wherein said using a diode laser comprises using a pulsed diode laser.

15. The method of claim 12, wherein said using a second laser comprises using a Q-switched laser, and the second power flux is on an order of MW in power.

16. The method of claim 15, wherein the second beam component is on an order of nanoseconds in duration.

17. The method of claim 12, wherein the mask is controlled to create a 2D optical pattern, and wherein the feedstock is sintered to the interface layer in accordance with the 2D optical pattern.

18. The method of claim 17, wherein the mask is dynamically controlled by a controller.

19. A method involving a substrate having an interface layer, wherein the interface layer forms only an upper surface portion of the substrate, and a feedstock material placed on the interface layer, the method comprising:

generating, using a first laser, a first beam component providing a first power flux level;

generating, using a second laser, a second beam component providing a second power flux level which is greater than said first power flux level;

using a mask configured between the feedstock material and the first and second lasers to produce a 2D optical image using the first and second beam components;

heating the feedstock material to a first level short of a melting point of the feedstock material, using the first beam component, at which point the particles of the feedstock material begin to experience surface tension forces relative to the interface layer of the substrate;

further heating the particles of feedstock material to a second level to melt the feedstock material and also to melt the interface layer of the substrate, wherein the interface layer of the substrate comprises a layer having a thickness less than a full thickness of the substrate, such that a portion of the interface layer remains unmelted by the second beam component as the particles of feedstock material and the interface layer are bonded together in accordance with the 2D optical pattern; and further configuring the laser system such that the second beam component has a duration less than the first beam component by a factor of at least $1 \times 10^{-3}$, and a power controlled to be in a MW range in order to only melt the interface layer of the substrate.

20. The method of claim 19, wherein using a mask comprises using a dynamically controllable mask to produce the 2D optical image.

* * * * *